United States Patent
Crosby

(10) Patent No.: US 9,773,350 B1
(45) Date of Patent: Sep. 26, 2017

(54) SYSTEMS AND METHODS FOR GREATER THAN 360 DEGREE CAPTURE FOR VIRTUAL REALITY

(71) Applicant: SilVR Thread, Inc., Northridge, CA (US)

(72) Inventor: Tai Crosby, North Hills, CA (US)

(73) Assignee: SilVR Thread, Inc., North Hills, CA (US)

( * ) Notice: Subject to any disclaimer, the term of this patent is extended or adjusted under 35 U.S.C. 154(b) by 0 days.

(21) Appl. No.: 14/855,180

(22) Filed: Sep. 15, 2015

Related U.S. Application Data

(60) Provisional application No. 62/051,103, filed on Sep. 16, 2014.

(51) Int. Cl.

| | |
|---|---|
| H04N 13/02 | (2006.01) |
| G06T 19/00 | (2011.01) |
| H04N 5/77 | (2006.01) |
| H04N 5/247 | (2006.01) |
| H04N 5/232 | (2006.01) |
| G02B 27/01 | (2006.01) |
| G06T 19/20 | (2011.01) |
| H04N 9/87 | (2006.01) |

(52) U.S. Cl.
CPC ........ *G06T 19/006* (2013.01); *G02B 27/0172* (2013.01); *G06T 19/20* (2013.01); *H04N 5/23238* (2013.01); *H04N 5/247* (2013.01); *H04N 5/772* (2013.01); *H04N 9/87* (2013.01); *G02B 2027/0138* (2013.01)

(58) Field of Classification Search
CPC .......... G02B 27/017; G02B 2027/0138; A61B 5/6803
See application file for complete search history.

(56) References Cited

U.S. PATENT DOCUMENTS

| | | | |
|---|---|---|---|
| 8,576,276 B2 | 11/2013 | Bar-Zeev | |
| 8,625,200 B2 | 1/2014 | Smith | |
| 9,521,398 B1 | 12/2016 | Woodman | |
| 2005/0207487 A1 | 9/2005 | Monroe | |
| 2008/0030429 A1 | 2/2008 | Hailpern | |
| 2010/0240988 A1 | 9/2010 | Varga | |
| 2011/0216060 A1* | 9/2011 | Weising | G09G 5/08 345/419 |
| 2012/0120103 A1* | 5/2012 | Border | G02B 27/017 345/633 |
| 2012/0206452 A1 | 8/2012 | Geisner | |
| 2013/0215281 A1 | 8/2013 | Hobby | |

(Continued)

FOREIGN PATENT DOCUMENTS

| | | |
|---|---|---|
| CN | 103731659 A | 4/2014 |
| DE | 102005063198 A | 7/2007 |
| DE | 202011003574 U1 | 8/2012 |

(Continued)

*Primary Examiner* — Zhubing Ren
(74) *Attorney, Agent, or Firm* — Sheppard Mullin Richter & Hampton LLP

(57) ABSTRACT

Systems and methods for capturing video information in the real world use a set of cameras that are supported, carried, and/or worn by a subject. Virtual reality content is generated based on the captured video and audio information, which provides a true point-of-view (POV) experience. Virtual reality content is played back for other users to have an experience based on the subject's experience.

11 Claims, 8 Drawing Sheets

(56) References Cited

U.S. PATENT DOCUMENTS

2014/0028704 A1   1/2014  Wu
2016/0344999 A1   11/2016 Lajeunesse

FOREIGN PATENT DOCUMENTS

| WO | 2012/166593 A2 | 12/2012 |
| WO | 2013/176997 A1 | 11/2013 |
| WO | 2014/033306 A1 | 3/2014 |
| WO | 2014/071400 A1 | 5/2014 |

* cited by examiner overlap 66

Look to the right
viewing direction
69b pair of eyes
68 viewing direction
69a

Look straight ahead

Look to the left
**viewing direction
69c**

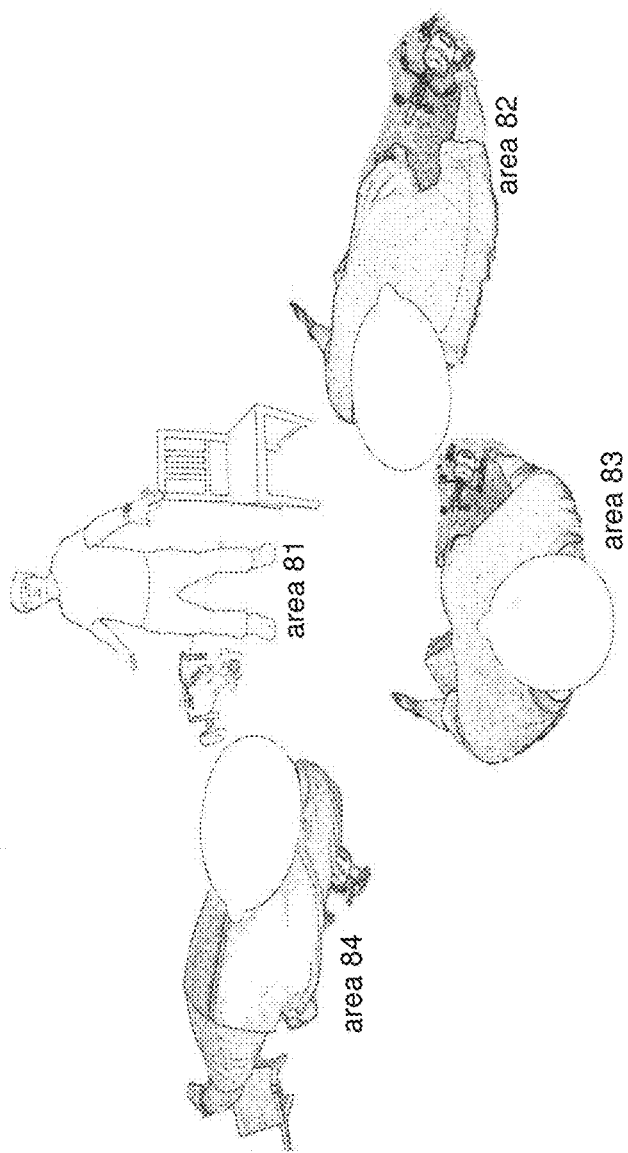

SYSTEMS AND METHODS FOR GREATER THAN 360 DEGREE CAPTURE FOR VIRTUAL REALITY

FIELD OF THE INVENTION

The systems and methods described herein generally relate to systems and methods for capture of video information, generation of virtual reality content based thereon, and playback of the generated virtual reality content, and, in particular, various implementations relate to systems and methods to create a true point-of-view (POV) experience in virtual reality.

BACKGROUND OF THE INVENTION

It is known that simulated virtual reality is a convenient way to share certain experiences, information, and/or views with other people. Such simulations may be based on three-dimensional models of real-world objects. By adding more photo-realistic elements to the virtual reality content, the visual quality of the user experience may improve. High-definition real-world video information may be captured and subsequently processed to create objects and/or elements within a virtual reality that have a higher image quality than comparable images from computer models.

SUMMARY

One aspect of the disclosed technology relates to systems for one or more of the following features: capturing video information in the real world, generating and storing virtual reality content based on the captured video information, and retrieving and playing back the generated virtual reality content for users. As used herein, the term "video information" may include both visual information and audio information (e.g. captured sound). As used herein, the term "playing back" and derivatives thereof with regard to video information, virtual reality content, and/or other information may include any combination of retrieving information from storage for use and/or rendering and streaming information for user and/or rendering. In some implementations, the captured video information may be live action. As used herein, the term "live action" may refer to capturing live events as they occur. In some implementations, the video information may be captured in real-time, or in near-real-time. As used herein, the term "real-time" may refer to capturing events at a rate sufficient to enable playback at the same rate as live action. As used herein, the term "near-real-time" may refer to capturing events at a rate sufficient to enable playback at any rate ranging from one-hundredth of the rate of live action to one hundred times the rate of live action, e.g. using time-lapse playback.

In some implementations, the captured video information may be first-person, as a user sees and experiences the real world around him. The disclosed technology creates a point-of-view experience in virtual reality that is closer to true point-of-view than existing systems employing a single camera, a pair of cameras that rotate and/or swivel around an axis between the pair of cameras, existing spherical capture configurations, and/or other existing virtual reality live capture hardware and/or techniques.

The system may include one or more of a set of cameras, electronic storage, one or more support structures, one or more sensors, an electronic display, a user interface, one or more physical processors, computer program components, and/or other components. As used herein, the term "camera" may include any device that captures images, including but not limited to a single lens-based camera, a sensor array, a solid-state camera, a mechanical camera, a digital camera, and/or other cameras.

The set of cameras may be configured to capture real-world video information. In some implementations, the set of cameras may be configured to capture real-world information in real-time and/or in high-definition. In some implementations, one or more cameras in the set of cameras may be positioned at or near eye-level of a person. This person may be referred to as the first user, the first subject, the first person, the original user, the experience-capturing user, and/or other names that are similar to these references, including derivatives thereof.

In some implementations, one or more cameras in the set of cameras may be arranged to capture video information that includes images captured in a downward direction, e.g. from the head of a person toward the ground. In some implementations, one or more cameras in the set of cameras may capture video information that includes images of a person who is supporting, carrying, and/or wearing the cameras, e.g. of the body of such a person, i.e. the first subject, etc. For example, in some implementations, one or more cameras in the set of cameras may be arranged and configured to capture video information that includes the front and back of the torso and/or body of the first subject.

In some implementations, one or more cameras in the set of cameras may be arranged to capture video information from multiple points of view. The multiple points of view may include one or more points of view that correspond to the first subject looking over his right shoulder and/or to his right, one or more points of view that correspond to the first subject looking over his left shoulder and/or to his left, one or more points of view that correspond to the first subject looking backwards, and/or other points of view. As used herein, use of the term "over the shoulder" and derivatives thereof may refer to one or more points of view in which a user turns his or her head left, right, and/or back. The term "over the shoulder" and derivatives neither implies nor is limited to looking down. For example, a particular point of view that corresponds to a subject looking over his left shoulder may include the point of view in which the subject turns his or her head left (e.g. by any number of degrees between zero and about 180 degrees) and views in any vertical direction. The vertical direction may be level with a default straight-forward point of view, or may be in a downward direction (e.g. by any number of degrees between zero and about 120 degrees), or may be in an upward direction (e.g. by any number of degrees between zero and about 120 degrees), and/or any combination thereof.

The support structure may be configured to support one or more cameras. In some implementations, the support structure may be configured to be worn and/or carried by a subject, e.g. such one or more cameras are positioned at or near eye-level of the (first) subject. In some implementations, the support structure may be configured such that one or more cameras are positioned at least at eye-level of the (first) subject. In some implementations, the support structure may be configured such that one or more cameras are positioned less than 1, 2, 3, 4, 5, 6, 7, 8, 9, or 10 inches above eye-level of the subject. In some implementations, the support structure may be configured such that one or more cameras are positioned less than 1, 2, 3, 4, 5, 6, 7, 8, 9, or 10 inches below eye-level of the subject. As a camera is positioned closer to eye-level, the point-of-view experience may be better. For example, capturing video with a mounting system that connects to a backpack may result in an inferior experience because the one or more cameras may be mounted more than 6 inches higher than the actual eye-level of a subject, e.g. 1 foot higher, 2 feet higher, or more than 2 feet higher.

In some implementations, the system may include a display support structure configured to support an electronic display. The display support structure may be configured to be carried and/or worn by users. By way of non-limiting example, a display support structure may include a helmet, goggles, head-up display, head-mounted display, and/or other structure to support an electronic display, a projector, and/or other structure to visually present information to a user.

The one or more processors may be configured (e.g. via executable instructions) to execute computer program components. The computer program components may include a camera control component, a generation component, a storage component, a compression component, a playback component, a parameter determination component, a transmission component, and/or other components.

In some implementations, the system may include and/or be embedded in a client computing platform. By way of non-limiting example, client computing platforms may include one or more of a desktop computer, a laptop computer, a handheld computer, a NetBook, a mobile telephone, a "smart phone", a tablet, a mobile computing platform, a gaming console, a television, an electronic device, and/or other computing platforms. Users may interact with any of the computing platforms described in this disclosure, and/or any combination of computing platforms described in this disclosure.

The camera control component may be configured to control one or more cameras. In some implementations, the camera control component may be configured to control (e.g. manage the operation of) a set of cameras to capture real-world video information, e.g. in real-time. For example, the camera control component may be configured to control the operational characteristics of multiple cameras, including but not limited to aperture timing, exposure, focal length, depth of field, focus, light metering, white balance, resolution, frame rate, compression parameters, video format, sound parameters, and/or other operational characteristics of video cameras. For example, the camera control component may be configured to synchronize multiple cameras, e.g. turn multiple cameras on and/or off.

The generation component may be configured to generate virtual reality content based on captured video information. As used here, in some implementations, the term "virtual reality" may include both the common concept of virtual reality as well as augmented reality. In some implementations, the generation component may be configured to combine video information from multiple cameras to generate virtual reality content. As used herein, the term virtual reality content refers to information representing a virtual reality that may be played back and/or otherwise experienced, perceived, and/or interacted with by one or more users, e.g. through a virtual reality environment that supports sensory experiences. Note that this user may be a different person than the experience-capturing subject. The user experiencing, perceiving, and/or interacting with the virtual reality content may be referred to as the second user, the second subject, the second person, the derivative user, and/or other names that are similar to these references, including derivatives thereof. In some implementations, multiple users may experience, perceive, and/or interact with the virtual reality content, e.g. at the same time. These multiple users may be referred to as the second subjects, the second set of people, the derivative users, or the secondary subjects, and/or other names that are similar to these reference, including derivatives thereof. By way of non-limiting example, the generation component may be configured to extract depth information, create stereoscopic information, stitch together and/or blend multiple images, and/or perform other operations on the captured video information.

The storage component may be configured to store, retrieve, and/or otherwise access information in and/or from electronic storage. In some implementations, the storage component may be configured to store virtual reality content in electronic storage. In some implementations, the storage component may be configured to communicate with electronic storage to access information, such as, by way of non-limiting example, virtual reality content.

The compression component may be configured to compress information prior, during, and/or after storage of the information in electronic storage. In some implementations, the compression component may be configured to perform lossless compression. In some implementations, the compression component may be configured to compress information with some loss of information upon decompression. In some implementations, the compression component may be configured to compress virtual reality content that is based on real-world video information corresponding to a view of a first number of degrees into a portion of a data structure used to store virtual reality content that corresponds to a view of a second number of degrees. In some implementations, the first number of degrees may be larger than the second number of degrees. For example, the first number of degrees may be 180 degrees. For example, the second number of degrees may be less than 180 degrees, 160 degrees, 150 degreed, 140 degrees, 120 degrees, and/or another number of degrees less than the first number of degrees.

The playback component may be configured to play back, present, and/or otherwise use virtual reality content for and/or to a user, e.g. a second user. In some implementations, the playback component may be configured to play back virtual reality content on an electronic display (and/or another structure configured to visually present information to a user). In some implementations, the virtual reality content may include images of the body of the first user.

In some implementations, the playback component may be configured to play back virtual reality content to a second user such that, responsive to the second user looking downward during playback, the virtual reality content includes imagery based on images of the body of the first user. In some implementations, operation of the playback component may be based on the actions, movement, and/or position of the second user. For example, the actions, movement, and/or position of the second user may be measured and/or otherwise reflected by one or more sensors, including but not limited to one or more accelerometers. For example, the second user may cause and/or otherwise effectuate a particular viewing direction. In some implementations, the playback component may be configured to play back virtual reality content to a second user such that, responsive to the second user looking over his right shoulder during playback, the virtual reality content includes imagery based on video information captured from the point of view of the first subject looking over his right shoulder. In some implementations, the playback component may be configured to play back virtual reality content to a second user such that, responsive to the second user looking over his left shoulder during playback, the virtual reality content includes imagery based on video information captured from the point of view of the first subject looking over his left shoulder. In some implementations, the playback component may be configured to play back virtual reality content to a second user such that, responsive to the second user changing his viewing direction to his right and/or over his right shoulder, the virtual reality content includes imagery based on video information captured from the point of view of the first subject looking over his right shoulder. In some implementations, the playback component may be configured to play back virtual reality content to a second user such that, responsive to the second user changing his viewing direction to his left and/or over his left shoulder, the virtual reality content includes imagery based on video information captured from the point of view of the first subject looking over his left shoulder. In some implementations, the playback component may be configured to match a change in viewing direction by the second user with corresponding virtual reality content that includes imagery based on the same viewing direction as the second user.

The parameter determination component may be configured to determine parameters based on output signals generated by sensors. For example, a sensor may be configured to generate output signals conveying information related to one or more angles of the second user's head and/or the second user's helmet (that may carry an electronic display that presents the virtual reality content). The parameter determination component may be configured to determine the one or more angles based on the generated output signals. The determined parameters may include one or more of position, location, movement, direction, acceleration, jerk, tilt, angle, derivatives thereof, and/or other parameters (including combinations of these parameters) pertinent to three-dimensional position and/or three-dimensional movement of a particular user, any body part of the particular user, any garment of object carried, worn, and/or otherwise supported by the particular user, and/or any object in a known and/or fixed relation to the particular user.

The transmission component may be configured to send, stream, and/or otherwise transmit information from the system to one or more second users, the display support structure, and/or another component of the system that is used to play back, present, and/or otherwise use virtual reality content for and/or to one or more users, e.g. the second user. In some implementations, the transmission component may be configured to retrieve information (e.g. virtual reality content) from the electronic storage. Alternatively, and/or simultaneously, in some implementations, the transmission component may be configured to support streaming content (e.g. virtual reality content) to a user (or to the device a user is using to experience the virtual reality content).

The sensors may be configured to generate output signals conveying information related to one or more parameters that are pertinent to the three-dimensional position and/or movement of a user. Such information and such parameters may be referred to as sensor information. For example, the three-dimensional position (or angle, etc.) of a head-mounted display may be used as a proxy for the position (or angle, etc.) of the head of a user, and subsequently used as a basis to determine a viewing direction of the user and/or other pertinent parameters for the playback of virtual reality content. By way of non-limiting example, the sensors may include one or more accelerometers, tilt sensors, motion sensors, image sensors, cameras, position sensors, global positioning sensors (GPS), vibration sensors, microphones, altitude sensors, pressure sensors, degree-of-freedom sensors (e.g. 6-DOF and/or 9-DOF sensors), a compass, and/or other sensors.

The electronic storage may be configured to electronically store information, including but not limited to virtual reality content and/or sensor information generated by the system. For example, the electronic storage may be configured to electronically store sensor information, e.g. time-stamped sensor information. In some implementations, the electronic storage may store instructions, code, commands, models, and/or other information used to execute computer program components.

The user interface may be configured to provide an interface between one or more users and the system. For example, a user may be able to interact with the system by virtue of the user interface. For example, the user interface may be configured to receive user input from a particular user, and direct and/or otherwise cause the system to operate in accordance with the received input.

As used herein, any association (or relation, or reflection, or indication, or correspondency) involving users/subjects, client computing platforms, cameras, points of view, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

One aspect of the disclosed technology relates to methods for one or more of the following features: capturing video information in real-time in the real world, generating and storing virtual reality content based on the captured video information, and retrieving and playing back the virtual reality content for users.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

BRIEF DESCRIPTION OF THE DRAWINGS

FIGS. 6A,6B,7A,7B,7C and 8 illustrate concepts and scenes related to the functionality of a system configured for capturing video information in real-time in the real world, generating and storing virtual reality content based on the captured video information, and retrieving and playing back the virtual reality content for users.

DETAILED DESCRIPTION

Figure 1:
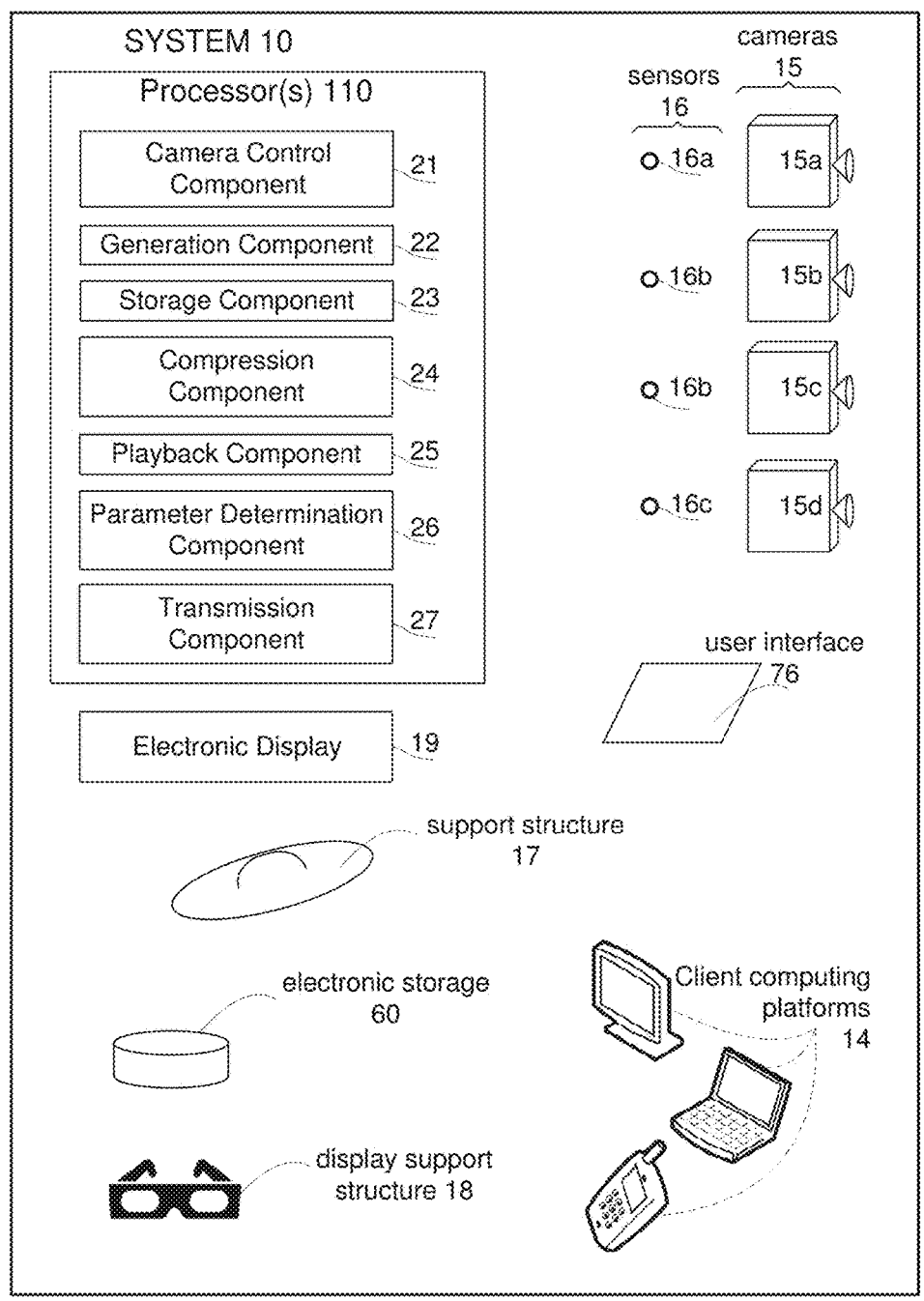
FIG. 1 illustrates a system configured for one or more of capturing video information in real-time in the real world, generating and storing virtual reality content based on the captured video information, and retrieving and/or playing back the virtual reality content for users, in accordance with one or more implementations.

FIG. 1 illustrates an example system 10 that is configured for one or more of capturing video information in real-time in the real world, generating and storing virtual reality content based on the captured video information, and retrieving and playing back the virtual reality content for users. As illustrated in FIG. 1, by way of non-limiting example, system 10 may include one or more cameras 15, one or more client computing platforms 14, one or more sensors 16, electronic storage 60, an electronic display 19, a support structure 17, a display support structure 18, a user interface 76, one or more physical processors 110, one or more computer program components, and/or other components. The components in FIG. 1 may be communicatively coupled through one or more couplings, connectors, buses, and/or networks, including but not limited to the Internet. System 10 may be deployed, at least in part, using a network (e.g., a public network), and/or using commercial web services.

As depicted in FIG. 1, one or more cameras 15 (also referred to as set of cameras 15) may include camera 15a, camera 15b, camera 15c, and camera 15d. The number of cameras in set of cameras 15 is not intended to be limited in any way by the depiction in FIG. 1. Set of cameras 15 may include 2, 3, 4, 5, 6, 7, 8, 9, 10, 12, 16, 20, 36, 48, and/or any number greater than 2 cameras. In some implementations, set of cameras 15 may be configured to capture real-world information in real-time and/or in high-definition. In some implementations, one or more cameras in set of cameras 15 may be positioned at or near eye-level of a person (e.g. the first subject).

Figure 6A:
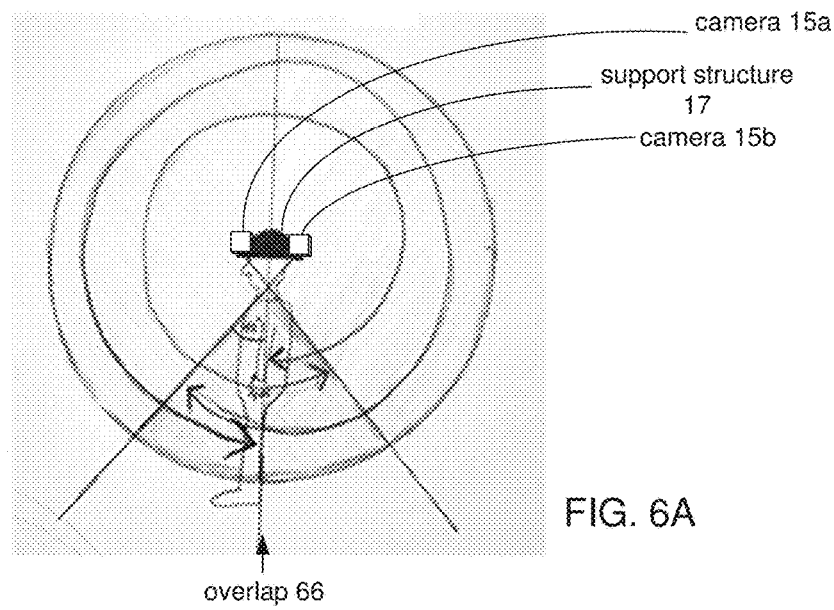

In some implementations, one or more cameras in set of cameras 15 may be arranged to capture video information that includes images captured in a downward direction, e.g. from the head of a person toward the ground. In some implementations, one or more cameras in set of cameras 15 may capture video information that includes images of a person who is supporting, carrying, and/or wearing the cameras, e.g. of the body of such a person, i.e. the first subject, etc. For example, in some implementations, one or more cameras in set of cameras 15 may be arranged and configured to capture video information that includes the front and back of the torso and/or body of the first subject. This video information may enable body-awareness for the second user (e.g. the second user can look down at any part of his body and see, in the generated virtual reality content, the corresponding captured video information of the first user). In some implementations, one or more cameras in set of cameras 15 may be arranged to capture real-world video information in real-time in a vertical plane traversing more than 360 degrees, by virtue of multiple cameras having overlapping views. For example, the images captured in a downward direction by multiple cameras may overlap by at least 30 degrees, by about 40 degrees, by about 60 degrees, by about 80 degrees, and/or by another number of degrees. In some implementations, set of cameras 15 may be configured to capture more than 360 degrees vertically and/or in a vertical plane, e.g. by virtue of cameras having overlapping views and multiple points of view. By way of non-limiting example, FIG. 6A illustrates a first subject wearing a support structure 17 that carries two cameras: camera 15a and camera 15b. FIG. 6A depicts a vertical overlap 66 of about 40 degrees.

In some implementations, cameras in set of cameras 15 may be arranged to capture video information from multiple points of view. The multiple points of view may include one or more points of view that corresponds to the first subject looking over his right shoulder (or to his right), one or more points of view that corresponds to the first subject looking over his left shoulder (or to his left), one or more points of view that corresponds to the first subject looking backwards, and/or other points of view. In some implementations, cameras in set of cameras 15 may be arranged to capture video information in multiple vertical viewing directions per horizontal viewing direction. For example, cameras in set of cameras 15 may be arranged to capture video information at horizontal viewing directions of zero degrees, 10 degrees to the right, 20 degrees to the right, 30 degrees to the right, 40 degrees to the right, 50 degrees to the right, 60 degrees to the right, 70 degrees to the right, 80 degrees to the right, 90 degrees to the right, 100 degrees to the right, 110 degrees to the right, 120 degrees to the right, 130 degrees to the right, 140 degrees to the right, 150 degrees to the right, 160 degrees to the right, 170 degrees to the right, 180 degrees to the right, 190 degrees to the right (i.e. turning past straight backwards), 200 degrees to the right, 210 degrees to the right, and/or another suitable degrees to the right. In some implementations, cameras in set of cameras 15 may be arranged to capture video information in multiple vertical viewing directions per horizontal viewing direction, including vertical viewing directions of zero degrees, 10 degrees upward, 20 degrees upward, 30 degrees upward, 40 degrees upward, 50 degrees upward, 60 degrees upward, 70 degrees upward, 80 degrees upward, 90 degrees upward, 100 degrees upward (i.e. turning upward past straight up), 110 degrees upward, 120 degrees upward, 10 degrees downward, 20 degrees downward, 30 degrees downward, 40 degrees downward, 50 degrees downward, 60 degrees downward, 70 degrees downward, 80 degrees downward, 90 degrees downward, 100 degrees downward (i.e. turning downward past straight down), 110 degrees downward, 120 degrees downward and/or another suitable degrees upward or downward.

In some implementations, multiple cameras in set of cameras 15 may be configured to capture video information from multiple backwards-looking points of view. For example, a particular point of view of the first subject looking backwards over his right shoulder may be different from a particular point of view of the first subject looking over his left shoulder. For example, the specific portion of the body of the first subject that is captured for both backward-looking points of view may be different. The corresponding virtual reality content may be different.

Figure 6B:
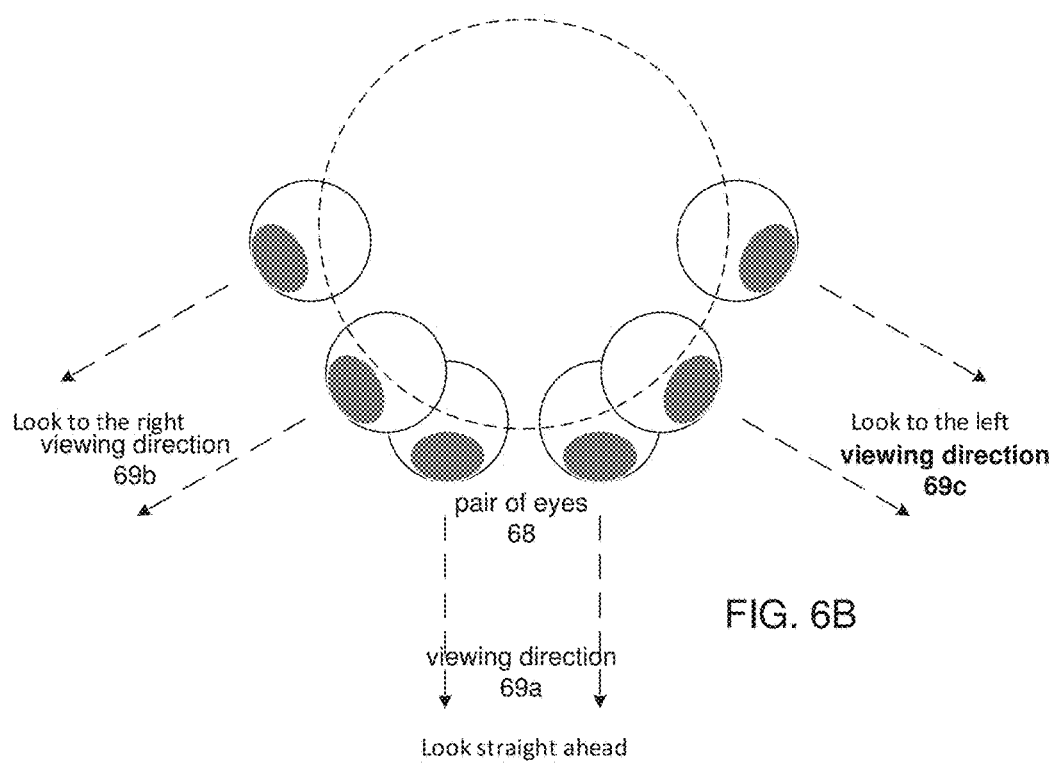

In some implementations, a first point of view of looking straight ahead and a second point of view of looking to one side may have viewing directions that are, e.g., 90 degrees apart. In some implementations, the positions of the cameras capturing both points of view maybe at least 6 inches apart, about 10 inches apart, about 12 inches apart, about 18 inches apart, and/or another distance apart. For example, the positions may be less than 18 inches apart. In some implementations, cameras in set of cameras 15 may be arranged to capture video information that more accurately mimics the movement of a person's eyes when he looks to the side and/or over his shoulder. For example, human eyes do not swivel around an axis located between the eyes, but rather move in an arc or curve responsive to a person rotating his or her neck. In some implementations, cameras may be arranged along a similar arc or curve to capture video information. By way of non-limiting example, FIG. 6B illustrates a top view of a pair of eyes 68 in three different viewing directions: a viewing direction 69a that corresponds to a person looking straight ahead, a viewing direction 69b that corresponds to a person looking to his right by about 45 degrees, and a viewing direction 69c that corresponds to a person looking to his left by about 45 degrees. FIG. 6B illustrates that the position of a pair of eyes moves as a person looks right or left, and that the movement of the eyes forms an arc or curve, for example along the dotted circle in FIG. 6B.

In some implementations, one or more cameras in set of cameras 15 may be arranged to capture real-world video information in real-time in a horizontal plane traversing more than 360 degrees, by virtue of multiple cameras having overlapping views. For example, the images captured in different horizontal directions by multiple cameras may overlap by at least 30 degrees, by about 40 degrees, by about 60 degrees, by about 80 degrees, and/or by another number of degrees. In some implementations, set of cameras 15 may be configured to capture more than 360 degrees horizontally and/or in a horizontal plane, e.g. by virtue of cameras having overlapping views and multiple points of view.

Support structure 17 may be configured to support one or more cameras in set of cameras 15. In some implementations, support structure 17 may be configured to be worn and/or carried by a subject, e.g. such one or more cameras in set of cameras 15 are positioned at or near eye-level of the (first) subject. In some implementations, support structure 17 may be configured such that one or more cameras in set of cameras 15 are positioned at or near eye-level of the (first) subject. In some implementations, support structure 17 may be configured such that one or more cameras in set of cameras 15 are positioned less than 1, 2, 3, 4, 5, 6, 7, 8, 9, or 10 inches above eye-level of the first subject. In some implementations, support structure 17 may be configured such that one or more cameras in set of cameras 15 are positioned less than 1, 2, 3, 4, 5, 6, 7, 8, 9, or 10 inches below eye-level of the first subject. As a camera is positioned closer to eye-level, the point-of-view experience may be better.

Figure 7B:
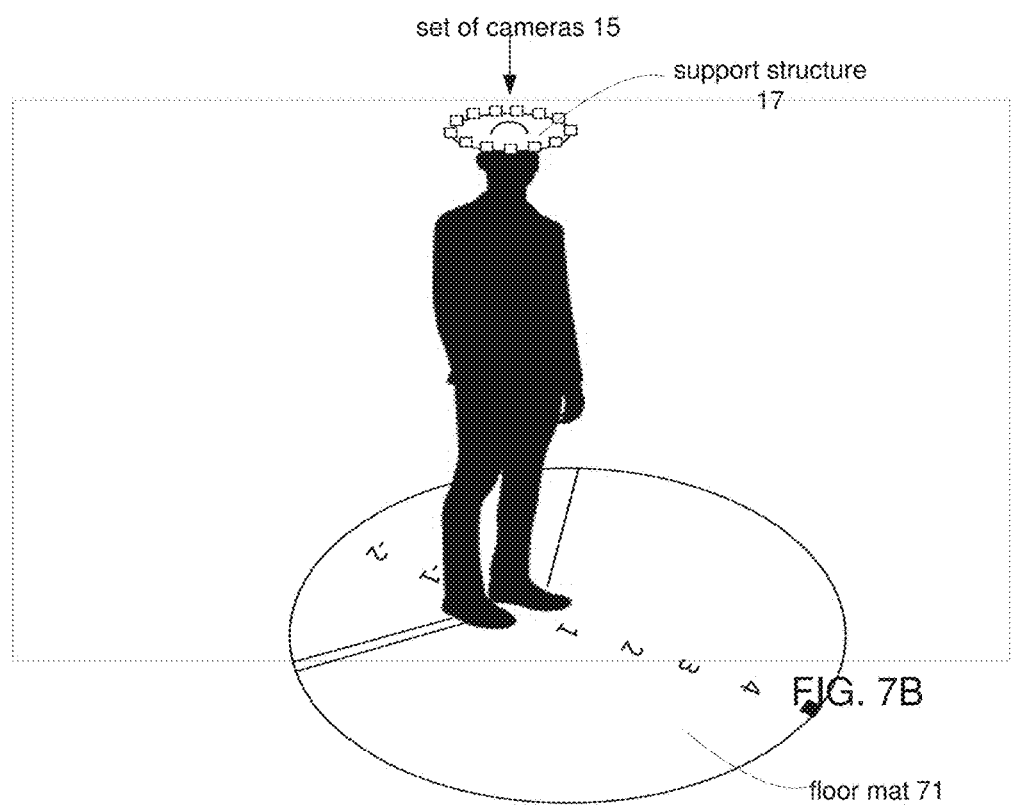
Figures 7A, 7C:
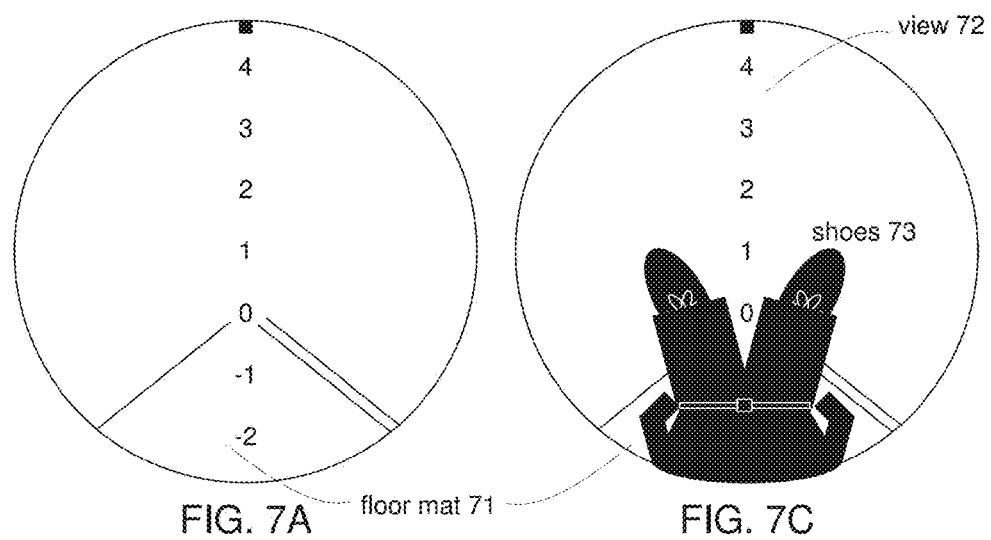

In some implementations, support structure 17 may include one or more of a forward-facing side, a backward-facing side, a right-facing side, a left-facing side, and/or other sides. A first subset of cameras from set of cameras 15 may be positioned at or near the forward-facing side of support structure 17 to capture video information that includes images of a first area around the first subject's feet. Some portion of the first area may include a second area on the backward-facing side of the first subject's feet, relative to the orientation of support structure 17. This may be similar to the natural view of a person looking down to his feet and seeing not only feet or shoes, but also a small area behind the feet or shoes. By way of non-limiting example, FIG. 7A-7B-7C illustrate the concept of a first-person view that includes an area around a person's feet. FIG. 7A depicts a floor mat 71 that includes numbers that are placed 1 foot apart. Floor mat 71 is circular and its diameter is more than 6 feet. FIG. 7B depicts a person (e.g. a first subject) standing on floor mat 71 at or near the number zero. The person depicted in FIG. 7B is wearing a support structure 17 (similar to a helmet) that carries a set of cameras 15 (each camera depicted as a square). FIG. 7C depicts the point-of-view 72 of the same person in FIG. 7B if the person were to look down to his feet. Point-of-view 72 includes not only the person's shoes 73 (and part of his body), but also an area behind the person's shoes 73. As depicted in FIG. 7C, the edge of point-of-view 72 may coincide with the edge of floor mat 71.

A second subset of cameras from set of cameras 15 may be positioned at or near the backward-facing side of support structure 17 to capture video information that includes images of a third area around the first subject's feet. Some portion of the third area may include a fourth area on the forward-facing side of the first subject's feet, relative to the orientation of support structure 17.

In some implementations, system 10 may include display support structure 18 configured to support electronic display 19. Display support structure 18 may be configured to be carried and/or worn by users. By way of non-limiting example, display support structure 18 may include a helmet, goggles, head-up display, head-mounted display, and/or other structure to support an electronic display, a projector, and/or other structure to visually present information to a user.

As depicted in FIG. 1, one or more sensors 16 may include sensor 16a, sensor 16b, sensor 16c, and sensor 16d. The number of sensors is not intended to be limited in any way by the depiction in FIG. 1. System 10 may include 1, 2, 3, 4, 5, 6, 7, 8, 9, 10, 12, 16, 20, 36, 48, and/or any number greater than 2 sensors. One or more physical processors 110 may be configured to execute computer program components. The computer program components may include a camera control component 21, a generation component 22, a storage component 23, a compression component 24, a playback component 25, a parameter determination component 26, a transmission component 27, and/or other components.

One or more physical processors 110 may be configured to provide information processing capabilities in system 10. As such, physical processor 110 may include one or more of a digital processor, an analog processor, a digital circuit designed to process information, an analog circuit designed to process information, a state machine, and/or other mechanisms for electronically processing information. Although physical processor 110 may be shown in FIG. 1 as a single entity, this is for illustrative purposes only. In some implementations, physical processor 110 may include a plurality of processing units. These processing units may be physically located within the same device, or physical processor 110 may represent processing functionality of a plurality of devices operating in coordination (e.g., "in the cloud", and/or other virtualized processing solutions).

Camera control component 21 may be configured to control one or more cameras (e.g., in set of cameras 15). In some implementations, camera control component 21 may be configured to control (e.g. manage the operation of) set of cameras 15 to capture real-world video information, e.g. in real-time. For example, camera control component 21 may be configured to control the operational characteristics of multiple cameras, including but not limited to aperture timing, exposure, focal length, depth of field, focus, light metering, white balance, resolution, frame rate, compression parameters, video format, sound parameters, and/or other operational characteristics of video cameras. For example, camera control component 21 may be configured to synchronize multiple cameras, e.g. turn multiple cameras on and/or off.

One or more sensors 16 may be configured to generate output signals conveying information related to one or more parameters that are pertinent to the three-dimensional position and/or movement of a user. For example, a sensor may be configured to generate output signals conveying information related to one or more angles of the first user's head and/or the first user's helmet. In some implementations, information and/or parameters based on the one or more sensors 16 may be captured at the same time as set of cameras 15 captures video information. In some implementations, information and/or parameters based on the one or more sensors 16 may be stored in electronic storage 60.

Generation component 22 may be configured to generate virtual reality content based on captured video information. In some implementations, generation component 22 may be configured to combine video information from multiple cameras to generate virtual reality content. By way of non-limiting example, generation component 22 may be configured to extract depth information, create stereoscopic information, stitch together and/or blend multiple images, and/or perform other operations on the captured video information.

Storage component 23 may be configured to store, retrieve, and/or otherwise access information in and/or from electronic storage 60. In some implementations, storage component 23 may be configured to store virtual reality content in electronic storage 60. In some implementations, storage component 23 may be configured to store information and/or parameters based on the one or more sensors 16 in electronic storage 60. In some implementations, storage component 23 may be configured to communicate with electronic storage 60 to access information, such as, by way of non-limiting example, virtual reality content.

Compression component 24 may be configured to compress information prior, during, and/or after storage of the information in electronic storage 60. In some implementations, compression component 24 may be configured to perform lossless compression. In some implementations, compression component 24 may be configured to compress information with some loss of information upon decompression. In some implementations, compression component 24 may be configured to compress virtual reality content that is based on real-world video information corresponding to a view of a first number of degrees into a portion of a data structure used to store virtual reality content that corresponds to a view of a second number of degrees. In some implementations, the first number of degrees may be larger than the second number of degrees. For example, the first number of degrees may be 180 degrees. For example, the second number of degrees may be less than 180 degrees, 160 degrees, 150 degreed, 140 degrees, 120 degrees, and/or another number of degrees less than the first number of degrees.

Playback component 25 may be configured to play back, present, and/or otherwise use virtual reality content for and/or to a user, e.g. a second user. In some implementations, playback component 25 may be configured to play back virtual reality content on electronic display 19 (and/or another structure configured to visually present information to a user). In some implementations, the virtual reality content may include images of the body of the first user. In some implementations, operation of playback component 25 may be controlled by the second user (e.g. through movement and/or through interaction with user interface 76). Alternatively, and/or simultaneously, in some implementations, operation of playback component 25 may be controlled by a control application. Combinations of multiple types of operation are envisioned within the scope of this disclosure.

In some implementations, playback component 25 may be configured to play back virtual reality content to a second user such that, responsive to the second user looking downward during playback, the virtual reality content includes imagery based on images including the body of the first user. In some implementations, operation of playback component 25 may be based on the actions, movement, and/or position of the second user. For example, the actions, movement, and/or position of the second user may be measured and/or otherwise reflected by one or more sensors 16, including but not limited to one or more accelerometers. For example, the second user may cause and/or otherwise effectuate a particular viewing direction, e.g. by rotating his head. In some implementations, playback component 25 may be configured to play back virtual reality content to a second user such that, responsive to the second user looking over his right shoulder (or to his right) during playback, the virtual reality content includes imagery based on video information captured from the point of view of the first subject looking over his right shoulder (or to his right). The video information captured from the point of view of the first subject looking over his right shoulder (or to his right) may include all or part of the right shoulder, the right arm, the right hand, fingers on the right hand, and/or other body parts that the first user might see when looking over his right shoulder and/or to his right. In some implementations, playback component 25 may be configured to play back virtual reality content to a second user such that, responsive to the second user looking over his left shoulder (or to his left) during playback, the virtual reality content includes imagery based on video information captured from the point of view of the first subject looking over his left shoulder (or to his left). The video information captured from the point of view of the first subject looking over his left shoulder (or to his left) may include all or part of the left shoulder, the left arm, the left hand, fingers on the left hand, and/or other body parts that the first user might see when looking over his left shoulder and/or to his left.

By way of non-limiting example, FIG. 8 depicts the concept of a person looking over his shoulder using a composite view including four areas: area 81, area 82, area 83, and area 84. Area 81 depicts a first user who has moved his left arm in front of his body and his right arm behind his body, thus turning his shoulders accordingly. His left arm reaches for a chair and his right arm points at a tricycle. Area 82 depicts the point-of-view of the same user as in area 81, responsive to the user looking over his right shoulder. Area 84 depicts the point-of-view of the same user, responsive to the user looking over his left shoulder. Area 83 depicts the point-of-view of the same user, responsive to the user looking forward and slightly downward. In some implementations, a system similar to system 10 may simultaneously capture video information in multiple viewing directions corresponding to the point-of-view in area 82, 83, and 84.

In some implementations, playback component 25 may be configured to play back virtual reality content to a second user such that, responsive to the second user changing his viewing direction to his right and/or over his right shoulder, the virtual reality content includes imagery based on video information captured from the point of view of the first subject looking over his right shoulder and/or to his right. In some implementations, playback component 25 may be configured to play back virtual reality content to a second user such that, responsive to the second user changing his viewing direction to his left and/or over his left shoulder, the virtual reality content includes imagery based on video information captured from the point of view of the first subject looking over his left shoulder and/or to his left. In some implementations, playback component 25 may be configured to match a change in viewing direction by the second user with corresponding virtual reality content that includes imagery based on the point of view (of the first user) in same viewing direction as the second user.

Parameter determination component 26 may be configured to determine parameters based on output signals generated by one or more sensors 16. For example, a sensor may be configured to generate output signals conveying information related to one or more angles of the second user's head and/or the second user's helmet (that may carry electronic display 19 that is configured to present the virtual reality content). Parameter determination component 26 may be configured to determine the one or more angles based on the generated output signals. The determined parameters may include one or more of position, location, movement, direction (e.g. cardinal direction such as the direction relative to magnetic North and/or true North), acceleration, jerk, tilt, angle, derivatives thereof, and/or other parameters (including combinations of these parameters) pertinent to three-dimensional position and/or three-dimensional movement (also referred to as positional information) of a particular user, any body part of the particular user, any garment of object carried, worn, and/or otherwise supported by the particular user, and/or any object in a known and/or fixed relation to the particular user.

Transmission component 27 may be configured to send, stream, and/or otherwise transmit information from system 10 to the second user, display support structure 18, and/or another component of system 10 used to play back, present, and/or otherwise use virtual reality content for and/or to a user, e.g. the second user. In some implementations, transmission component 27 may be configured to retrieve information (e.g. virtual reality content) from electronic storage 60. Alternatively, and/or simultaneously, in some implementations, transmission component 27 may be configured to support streaming content (e.g. virtual reality content) to a user (or to the device a user is using to experience the virtual reality content).

One or more sensors 16 may be configured to generate output signals conveying information related to one or more parameters that are pertinent to the three-dimensional position and/or movement of a user. For example, the three-dimensional position (or angle, etc.) of a head-mounted display may be used as a proxy for the position (or angle, etc.) of the head of a user, and subsequently used as a basis to determine a viewing direction of the user and/or other pertinent parameters for the playback of virtual reality content. By way of non-limiting example, one or more sensors 16 may include one or more accelerometers, tilt sensors, motion sensors, image sensors, cameras, position sensors, global positioning sensors (GPS), vibration sensors, microphones, altitude sensors, pressure sensors, degree-of-freedom sensors (e.g. 6-DOF and/or 9-DOF sensors), a compass, and/or other sensors.

It should be appreciated that although components 21-27 are illustrated in FIG. 1 as being located and/or co-located within a particular component of system 10, in implementations in which physical processor 110 includes multiple processing units, one or more of components 21-27 may be located remotely from the other components. The description of the functionality provided by the different components 21-27 described herein is for illustrative purposes, and is not intended to be limiting, as any of components 21-27 may provide more or less functionality than is described. For example, one or more of components 21-27 may be eliminated, and some or all of its functionality may be incorporated, shared, integrated into, and/or otherwise provided by other ones of components 21-27. Note that physical processor 110 may be configured to execute one or more additional components that may perform some or all of the functionality attributed below to one of components 21-27.

Electronic storage 60 in FIG. 1 comprises electronic storage media that electronically stores information. The electronic storage media of electronic storage 60 may include one or both of system storage that is provided integrally (i.e., substantially non-removable) with system 10 and/or removable storage that is connectable to system 10 via, for example, a port (e.g., a USB port, a FIREWIRE port, etc.) or a drive (e.g., a disk drive, etc.). In some implementations, the electronic storage media of electronic storage 60 may include storage that is connectable to system 10 wirelessly. Electronic storage 60 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 60 may store sensor information (e.g. time-stamped sensor information such that specific sensor information may be correlated with specific captured video information), software algorithms, information determined by physical processor 110 or any computer program components, information received via a user interface, and/or other information that enables system 10 to function properly. For example, electronic storage 60 may store virtual reality content, positional information (as discussed elsewhere herein), and/or other information. Electronic storage 60 may be a separate component within system 10, or electronic storage 60 may be provided integrally with one or more other components of system 10 (e.g., physical processor 110).

User interface 76 of system 10 in FIG. 1 may be configured to provide an interface between system 10 and a user through which the user can provide information to and receive information from system 10. This enables data, results, and/or instructions and any other communicable items, collectively referred to as "information," to be communicated between the user and system 10. An example of information that may be conveyed to a user is the virtual reality content, etc. An example of information that may be conveyed by a user is a viewing direction and/or change in viewing direction, etc. Examples of interface devices suitable for inclusion in user interface 76 include a keypad, buttons, switches, a keyboard, knobs, levers, a display screen, a touch screen, speakers, a microphone, an indicator light, an audible alarm, and a printer. Information may be provided to a user by user interface 76 in the form of auditory signals, visual signals, tactile signals, and/or other sensory signals.

It is to be understood that other communication techniques, either hard-wired or wireless, are also contemplated herein as user interface 76. For example, in one implementation, user interface 76 may be integrated with a removable storage interface provided by electronic storage 60. In this example, information is loaded into system 10 from removable storage (e.g., a smart card, a flash drive, a removable disk, etc.) that enables the user(s) to customize system 10. Other exemplary input devices and techniques adapted for use with system 10 as user interface 76 include, but are not limited to, an RS-232 port, RF link, an IR link, modem (telephone, cable, Ethernet, internet or other). In short, any technique for communicating information with system 10 is contemplated as user interface 76.

Figure 2:
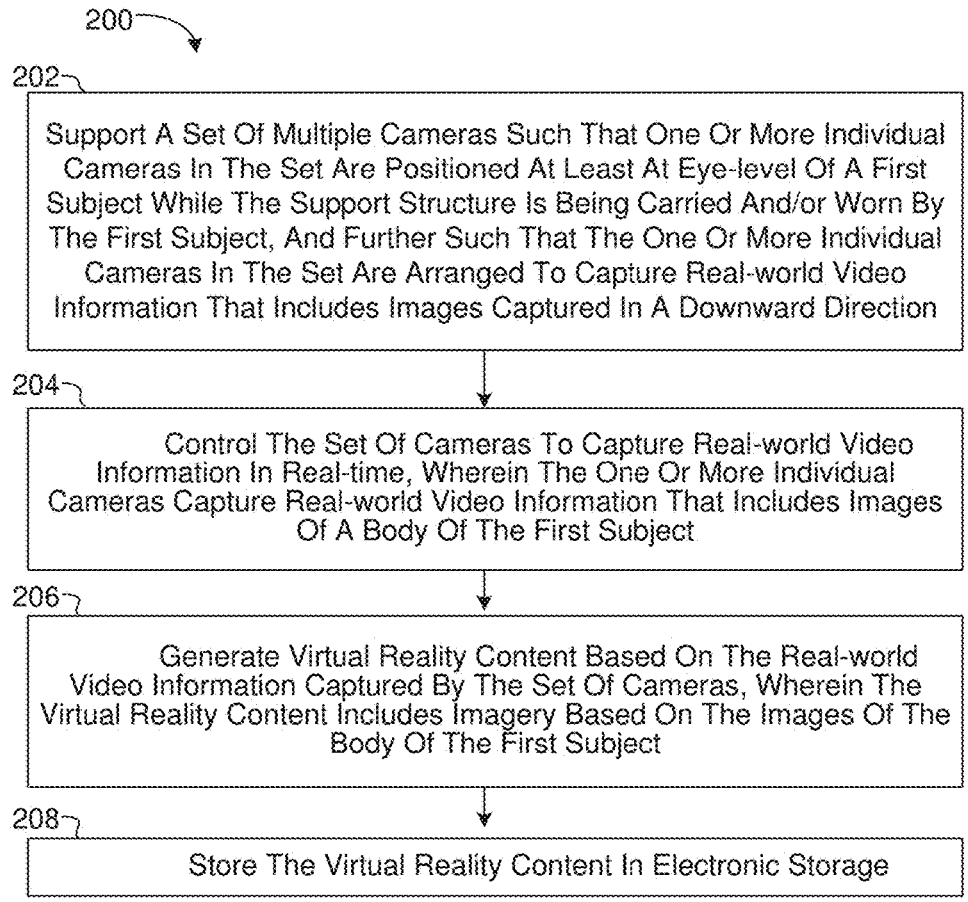
FIGS. 2-5 illustrate methods for one or more of capturing video information in real-time in the real world, generating and storing virtual reality content based on the captured video information, and retrieving and playing back the virtual reality content for users, in accordance with one or more implementations.
Figure 3:
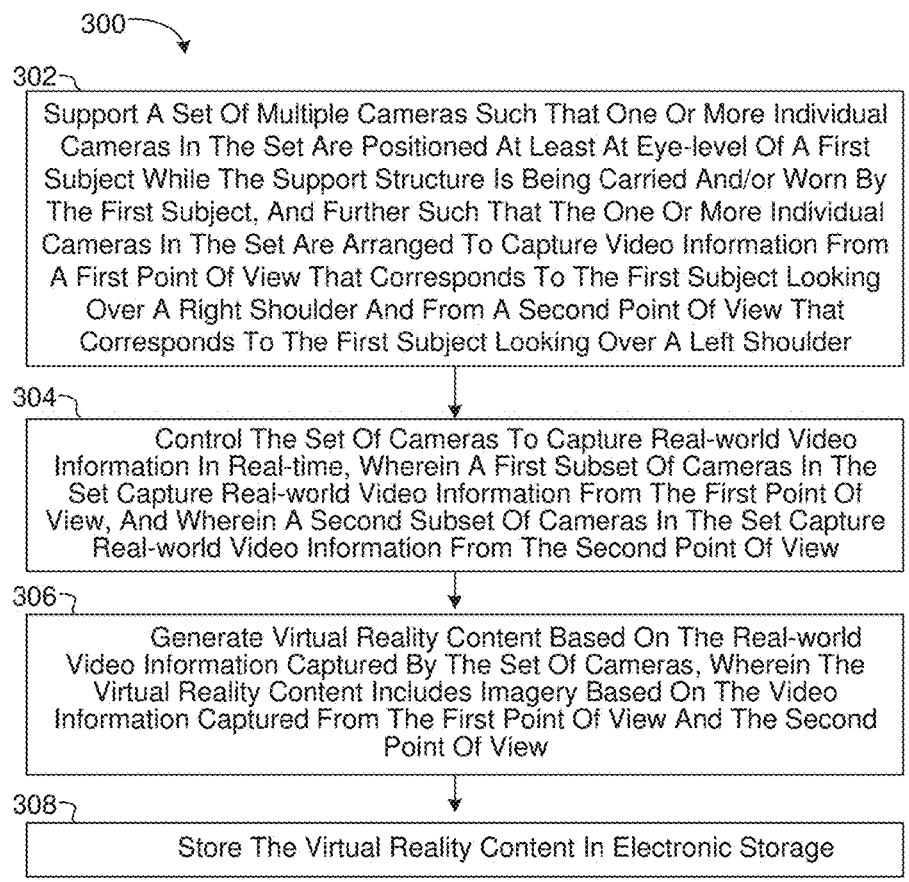
Figure 4:
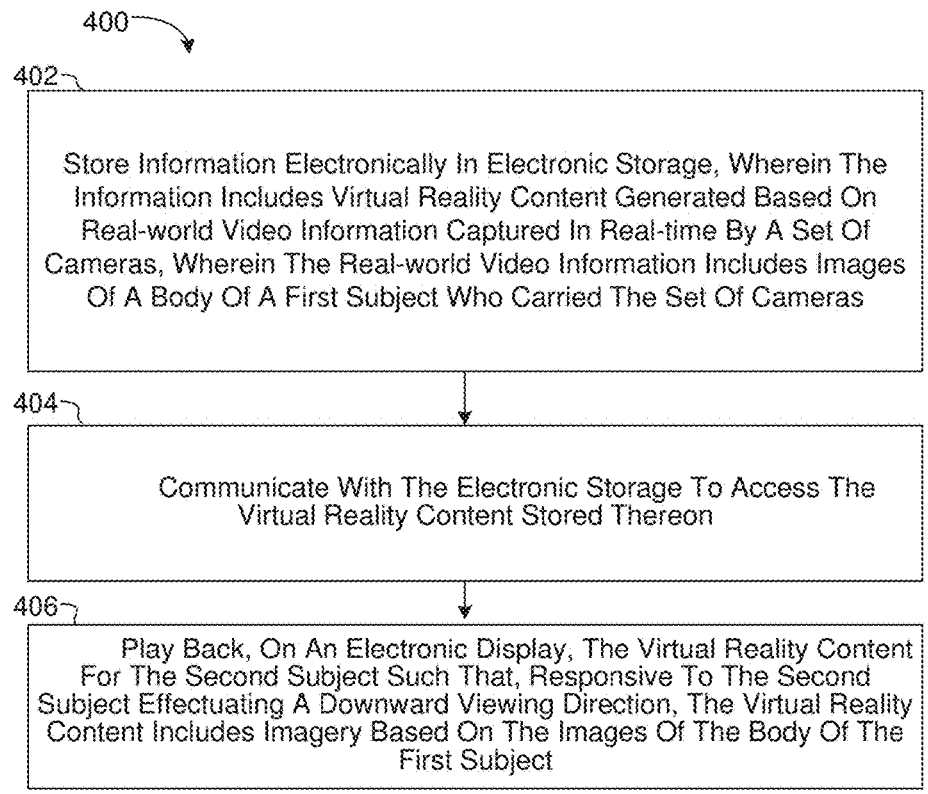
Figure 5:
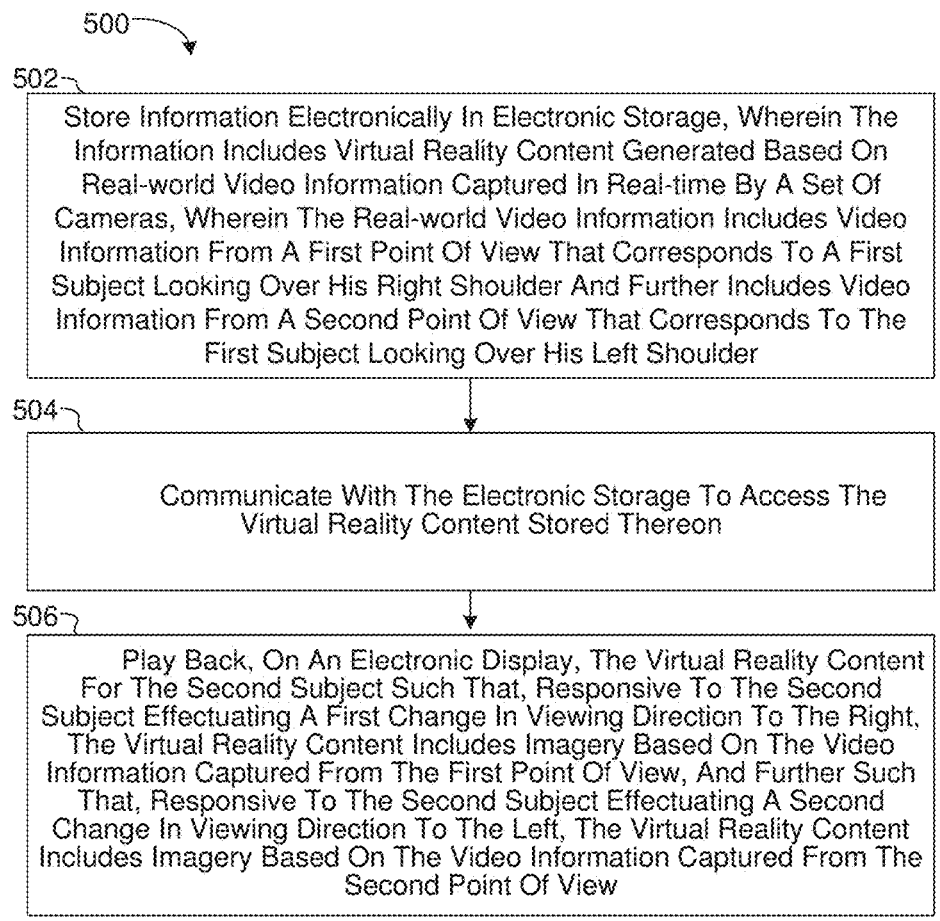

FIGS. 2-3 illustrate exemplary methods 200-300 for capturing video information in real-time in the real world near a first subject and storing generated virtual reality content based on the captured video information. FIGS. 4-5 illustrate exemplary methods 400-500 for playing back virtual reality content that is generated based on video information captured near a first subject in the real world, wherein the virtual reality content is played back for a second subject. The operations of methods 200-500 presented below are intended to be illustrative and non-limiting examples. In certain implementations, methods 200-500 may be accomplished with one or more additional operations not described, and/or without one or more of the operations discussed. Additionally, the order in which the operations of methods 200-500 are illustrated in FIGS. 2, 3, 4, and 5 and described below is not intended to be limiting.

In certain implementations, methods 200-500 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of methods 200-500 in response to instructions stored electronically on an electronic storage medium. The one or more processing devices may include one or more devices configured through hardware, firmware, and/or software to be specifically designed for execution of one or more of the operations of methods 200-500.

Regarding method 200, at an operation 202, a set of multiple cameras is supported such that one or more individual cameras in the set are positioned at least at eye-level of the first subject while the cameras and/or support structure is being carried and/or worn by the first subject, and further such that the one or more individual cameras in the set are arranged to capture real-world video information that includes images captured in a downward direction. In some implementations, operation 202 is performed by a support structure the same as or similar to support structure 17 (shown in FIG. 1 and described herein).

At an operation 204, the set of cameras is controlled to capture real-world video information in real-time. The one or more individual cameras capture real-world video information that includes images of a body of the first subject. In some implementations, operation 204 is performed by a camera control component the same as or similar to camera control component 21 (shown in FIG. 1 and described herein).

At an operation 206, virtual reality content is generated based on the real-world video information captured by the set of cameras. The virtual reality content includes imagery based on the images of the body of the first subject. In some implementations, operation 206 is performed by a generation component the same as or similar to generation component 22 (shown in FIG. 1 and described herein).

At an operation 208, the virtual reality content is stored in the electronic storage. In some implementations, operation 208 is performed by a storage component the same as or similar to storage component 23 (shown in FIG. 1 and described herein).

Regarding method 300, at an operation 302, a set of multiple cameras is supported such that one or more individual cameras in the set are positioned at least at eye-level of the first subject while the cameras and/or a support structure is being carried and/or worn by the first subject, and further such that the one or more individual cameras in the set are arranged to capture video information from a first point of view that corresponds to the first subject looking over the right shoulder and from a second point of view that corresponds to the first subject looking over the left shoulder. In some implementations, operation 302 is performed by a support structure the same as or similar to support structure 17 (shown in FIG. 1 and described herein).

At an operation 304, the set of cameras is controlled to capture real-world video information in real-time. A first subset of cameras in the set capture real-world video information from the first point of view. A second subset of cameras in the set capture real-world video information from the second point of view. In some implementations, operation 304 is performed by a camera control component the same as or similar to camera control component 21 (shown in FIG. 1 and described herein).

At an operation 306, virtual reality content is generated based on the real-world video information captured by the set of cameras. The virtual reality content includes imagery based on the video information captured from the first point of view, and further includes imagery based on the video information captured from the second point of view. In some implementations, operation 306 is performed by a generation component the same as or similar to generation component 22 (shown in FIG. 1 and described herein).

At an operation 308, the virtual reality content is stored in electronic storage. In some implementations, operation 308 is performed by a storage component the same as or similar to storage component 23 (shown in FIG. 1 and described herein).

Regarding method 400, at an operation 402, information is stored electronically in electronic storage. The information includes virtual reality content generated based on real-world video information captured in real-time by a set of cameras. The real-world video information includes images of a body of a first subject who carried the set of cameras. In some implementations, operation 402 is performed by a storage component the same as or similar to storage component 23 (shown in FIG. 1 and described herein).

At an operation 404, the virtual reality content is accessed through communication with the electronic storage. In some implementations, operation 404 is performed by a storage component the same as or similar to storage component 23 (shown in FIG. 1 and described herein).

At an operation 406, the virtual reality content is played back on an electronic display for a second subject such that, responsive to the second subject effectuating a downward viewing direction, the virtual reality content includes imagery based on the images of the body of the first subject. In some implementations, operation 406 is performed by a playback component the same as or similar to playback component 25 (shown in FIG. 1 and described herein).

Regarding method 500, at an operation 502, information is stored electronically in electronic storage. The information includes virtual reality content generated based on real-world video information captured in real-time by a set of cameras. The real-world video information includes video information from a first point of view that corresponds to the a first subject looking over his right shoulder and further includes video information from a second point of view that corresponds to the first subject looking over his left shoulder. In some implementations, operation 502 is performed by a storage component the same as or similar to storage component 23 (shown in FIG. 1 and described herein).

At an operation 504, the virtual reality content is accessed through communication with the electronic storage. In some implementations, operation 504 is performed by a storage component the same as or similar to storage component 23 (shown in FIG. 1 and described herein).

At an operation 506, the virtual reality content is played back on an electronic display for a second subject such that, responsive to the second subject effectuating a first change in viewing direction to the right, the virtual reality content includes imagery based on the video information captured from the first point of view, and further such that, responsive to the second subject effectuating a second change in viewing direction to the left, the virtual reality content includes imagery based on the video information captured from the second point of view. In some implementations, operation 506 is performed by a playback component 25 the same as or similar to playback component 25 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to capture video information in the real world near a first subject as the first subject experiences a real-world experience and to generate and subsequently store and/or transmit virtual reality content based on the captured video information, wherein the virtual reality content facilitates an artificial environment which is experienced through sensory stimuli including sights and sounds, wherein the sensory stimuli are provided by a computer, wherein a second subject's actions partially determine what happens in the artificial environment, the system comprising:

electronic storage configured to store information electronically;

a set of cameras configured to capture real-world video information, wherein one or more individual cameras in the set are arranged to capture the real-world video information from a point-of-view of the first subject, wherein the real-world video information includes images captured in multiple viewing directions simultaneously, wherein the multiple viewing directions include a downward viewing direction;

a support structure configured to support the set of multiple cameras and furthermore configured to be carried and/or worn by the first subject such that the one or more individual cameras are positioned at least at eye-level of the first subject while the support structure is being carried and/or worn by the first subject; and one or more physical processors configured via computer-readable instructions to:

control the set of cameras to capture, at a first moment in time, the real-world video information, wherein the one or more individual cameras capture the real-world video information that includes images of a body of the first subject as the first subject experiences the real-world experience;

generate virtual reality content that facilitates the artificial environment which is experienced, at a second moment in time after the first moment in time, through sensory stimuli including sights and sounds, wherein the second subject's actions partially determine what happens in the artificial environment, wherein the virtual reality content is based on the real-world video information captured as the first subject experienced the real-world experience, wherein actions by the second subject partially determine which images of the body of the first subject are experienced in the artificial environment by the second subject, wherein, responsive to the second subject adjusting a viewing direction while experiencing the artificial environment, the artificial environment is facilitated by the virtual reality content that is based on the real-world video information that includes the images captured in an individual viewing direction selected from the multiple viewing directions, wherein the individual viewing direction corresponds to the adjusted viewing direction of the second subject; and store the virtual reality content in the electronic storage.

2. The system of claim 1, wherein the support structure includes a helmet configured to be worn on the first subject's head.

3. The system of claim 1, wherein the one or more individual cameras are further positioned less than 3 inches above eye-level of the first subject.

4. The system of claim 1, wherein the one or more individual cameras in the set are further arranged to capture real-world video information that includes images captured both in front of and behind the first subject's feet, and wherein the virtual reality content further includes imagery based on the images in front of and behind the first subject's feet.

5. The system of claim 1, wherein the one or more physical processors are configured to generate the virtual reality content to be a photo-realistic representation of the real-world video information captured by the set of cameras.

6. The system of claim 1, wherein the set of cameras is configured and arranged to capture real-world video information in a vertical plane traversing more than 360 degrees, wherein the images captured in a downward direction overlap by at least 30 degrees.

7. The system of claim 6, wherein the one or more physical processors are configured to store the virtual reality content in a storage structure within the electronic storage by compressing the virtual reality content that is based on the real-world video information corresponding to a view of 180 degrees into a portion of the storage structure corresponding to a view of less than 180 degrees.

8. A system configured to play back virtual reality content that is generated based on video information captured near a first subject as the first subject experiences a real-world experience, wherein the virtual reality content facilitates an artificial environment which is experienced through sensory stimuli including sights and sounds, wherein the sensory stimuli are provided by a computer, wherein a second subject's actions partially determine what happens in the artificial environment, wherein the virtual reality content is played back for a second subject, the system comprising:

an electronic display configured to present information to the second subject;

electronic storage configured to store information electronically, wherein the information includes virtual reality content generated based on real-world video information captured by a set of cameras, from a point-of-view of the first subject, as the first subject experienced the real-word experience at a first moment in time, wherein the virtual reality content facilitates the artificial environment which is experienced, at a second moment in time after the first moment in time, by the second subject through sensory stimuli including sights and sounds, wherein the second subject's actions partially determine what happens in the artificial environment, wherein actions by the second subject partially determine which images of a body of the first subject are experienced in the artificial environment by the second subject, wherein, responsive to the second subject adjusting a viewing direction while experiencing the artificial environment, the artificial environment is facilitated by the virtual reality content that is based on the real-world video information that includes the images captured in an individual viewing direction selected from multiple viewing directions, wherein the individual viewing direction corresponds to the adjusted viewing direction of the second subject, wherein the first subject carried the set of cameras during capture of the real-world video information, wherein the real-world video information includes images captured in the multiple viewing directions simultaneously, wherein the multiple viewing directions include a downward viewing direction;

one or more physical processors configured via computer-readable instructions to:

communicate with the electronic storage to access the virtual reality content stored thereon; and play back, on the electronic display, the virtual reality content for the second subject such that, responsive to actions by the second subject that effectuate the downward viewing direction, the artificial environment experienced by the second subject includes the images captured in the downward viewing direction.

9. The system of claim 8, wherein the system further comprises a display support structure configured to support the electronic display and furthermore configured to be carried and/or worn by the second subject.

10. The system of claim 9, wherein the system further comprises one or more sensors configured to generate output signals conveying information related to one or more positional parameters of at least one of the second subject and the electronic display, and wherein the one or more physical processors are configured to play back the virtual reality content based on the one or more positional parameters.

11. The system of claim 8, wherein the first subject is a different person than the second subject.

* * * * *